…

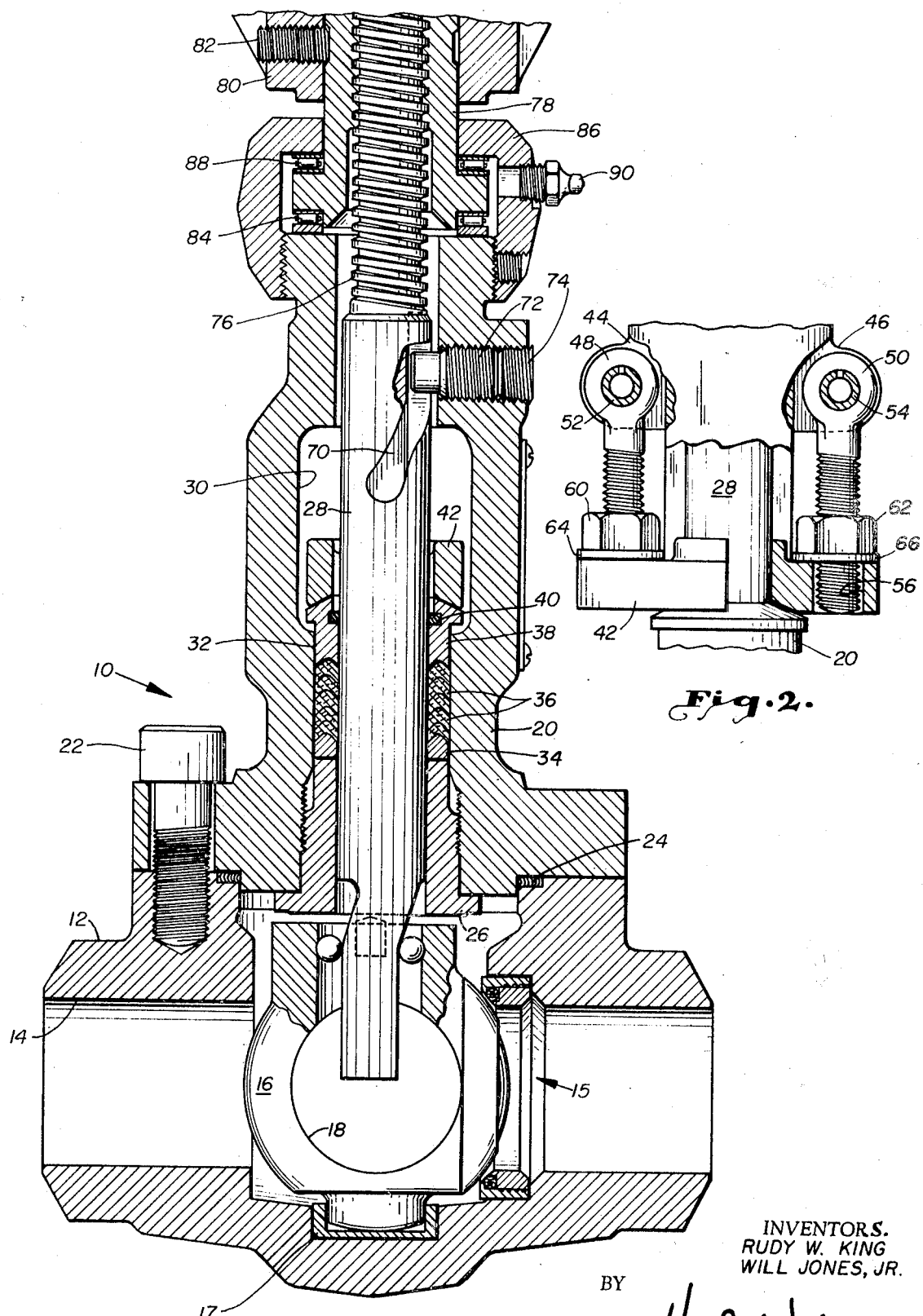

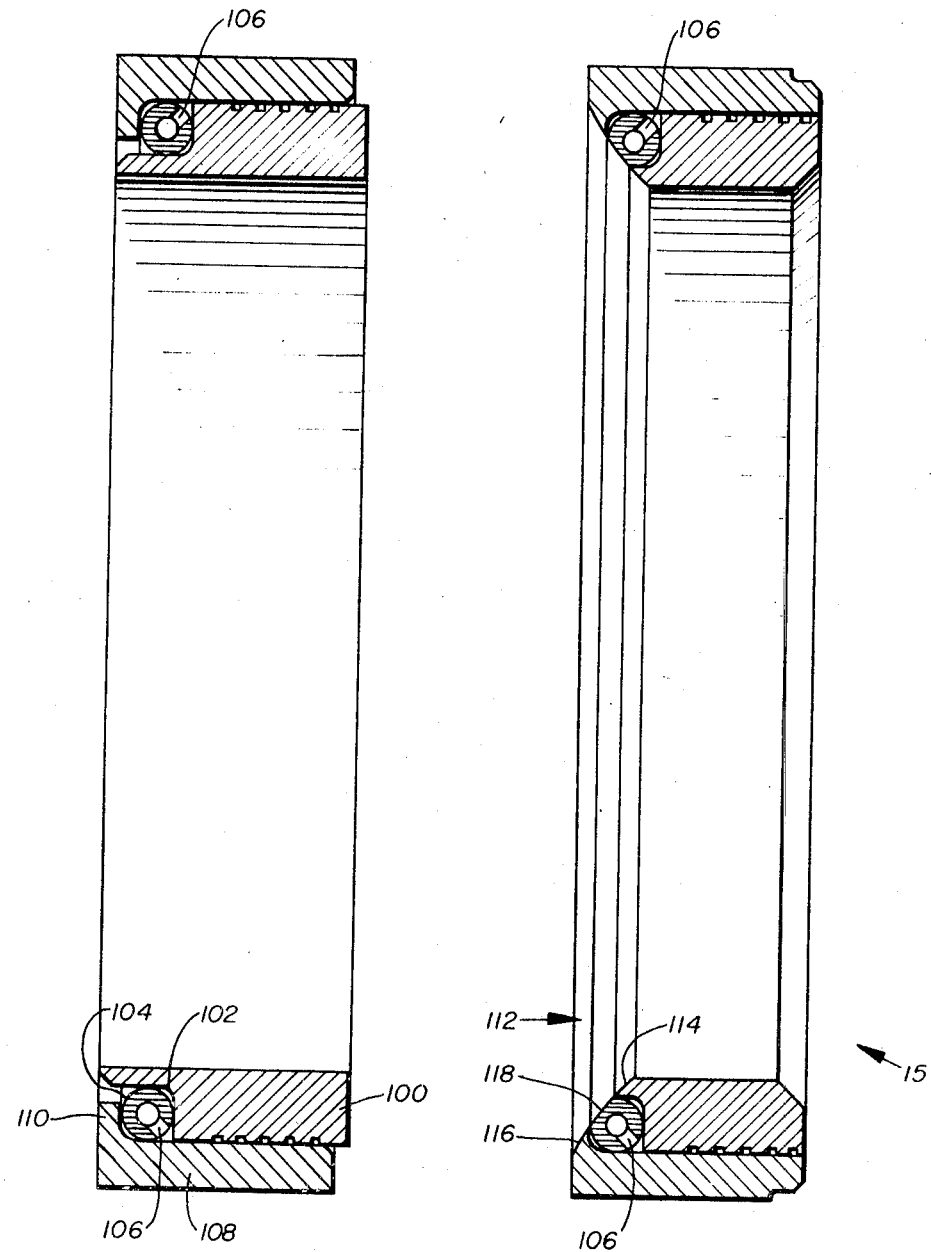

United States Patent Office 3,515,371
Patented June 2, 1970

3,515,371
VALVE AND VALVE SEAT
Rudy W. King and Will Jones, Jr., Little Rock, Ark., assignors, by mesne assignments, to Orbit Valve Company, a corporation of Arkansas
Filed June 6, 1966, Ser. No. 555,451
Int. Cl. F16k 41/00
U.S. Cl. 251—214
7 Claims

ABSTRACT OF THE DISCLOSURE

A valve for controlling flow of fluid under extreme conditions of high temperature, pressure, or chemically active material, is provided with a metallic valve seat which utilizes a groove within which is a metallic, e.g. stainless steel tubing insert machined to follow the normal contour of the seat.

---

This invention relates to a valve to operational components for control of extreme condition fluids. In particular, this invention is an improvement upon what are known under the trademark of the Orbit Valve Company as Orbit-type valves such as heretofore disclosed in prior U.S. Pats. 2,076,840; 2,076,841; 2,516,947; and 2,719,022. Generally speaking, such valves are those wherein a valve core is caused to rotate from a full open position to a position wherein the valve core is positioned opposite a valve seat with further pivotal movement of the core into closed seating engagement therewith. This movement is caused by the timed rotative movement and axial movement of the valve stem cooperatively with said valve core.

The valve of this invention provides a means for flow control of extreme condition fluids which are at a relatively high temperature, for example, upwards of 800° F., or are reactive chemically to disintegrate lower melting point materials such as packing materials, lubricants and nonmetallic valve seat materials. Specifically, this is accomplished by this invention by positioning the valve stem packing gland at a point away from direct contact with said high temperature fluids. In addition, means are described for maintaining the packing gland against high temperatures and pressures yet providing a readily accessible means for adjusting or repairing said packing. In addition, this invention provides a valve seat incorporating a metallic seating ring for providing a positive and permanent closure of said fluid flow system.

The objects of this invention will be best determined by reading the specification and claims in conjunction with the following illustrations of which:

FIG. 1 is a sectional view with the upper hand wheel portions of the valve removed.

FIG. 2 is a partial sectional view of the packing gland retaining and adjusting elements as viewed from approximately 90° from the view of FIG. 1.

FIG. 3 is a sectional view of the valve seat of this invention in its assembled condition prior to final machining.

FIG. 4 is a sectional view of the valve seat of this invention after final machining.

The valve of this invention, generally indicated by the numeral 10, generally includes a valve body portion 12 having an axial passageway 14 therethrough. Positioned within the body and coaxial with the passageway 14 is a valve seat generally indicated by the numeral 15 and hereinafter specifically described. The valve seat is positioned relative to a valve core 16 and includes an opening 18 therethrough to permit fluid flow across the valve body through passageway 14. The valve core 16 is rotatably and pivotally supported by a trunnion bushing 17. In the position shown, the valve core has been rotated approximately 90° from the full open postion to a position just prior to pivotal movement of core 16 into seating and sealing engagement with the valve seat 15. A valve bonnet 20 is bolted to the valve body 12 by a plurality of circumferentially spaced bolts 22. In some instances the bonnet 20 is welded to the valve body 12. A spiral-wound gasket of, for example, alternate layers of stainless steel and asbestos, indicated by the numeral 24, provides a seal between the valve body 12 and the bonnet 20. At the lower end of the bonnet a bonnet guide bushing 26 is provided to define an axial opening for valve stem 28 and to permit rotative and axial movement of the stem. The bushing further provides a a semi-protective and insulative barrier between packing elements 32, 34 and 36. The valve bonnet 20 is formed to provide a yoke-type opening 30 which communicates with the packing gland space. The packing gland is composed of a bottom header ring 34, preferably formed of a combination of Inconel and asbestos. Heat and corrosion resistant packing rings 36 are stacked thereabove terminating with a packing gland 38 which has an annular concave recess so as to substantially conform to the upper surface of packing rings 36. The packing gland includes an internal groove for retaining an O-type wiper ring 40. The upper surface of the packing gland 38 is beveled or curved to provide a semi-spherical surface. Above the packing gland surface is a gland retainer 42 which is best shown in FIG. 2. The gland retainer 42 includes a matching concave semi-spherical surface to provide a ball and socket-like connection between the packing gland retainer 42 and the upper surface of the packing gland 20. Above the yoke-type opening 30, formed as an integral part of bonnet 20, are wing portions 44 and 46 respectively, the gland retainer 42 being positioned approximately therebelow. Respective eyebolts 48 and 50 are rotatably retained in the wing elements by locking roll pins or bushings 52 and 54. Each of the eyebolts normally extends downwardly into respective openings 56 of gland retainer 42, only one of which is shown in FIG. 2. Each eyebolt further includes a lower threaded portion to which respective nuts 60 and 62 are attached with matching threads. Below each nut and between it and the upper surface of the gland retainer are respective flat washers 64 and 66.

The stem 28, extending axially through the bonnet and the packing glands heretofore described, includes a spiral groove or slot 70 within which a fixed stem guide or follower 72 cooperates, the stem guide being retained to the bonnet by set screw 74. Continuing upwardly, the stem 28 terminates with left-hand acme threads 76. These are engaged within matching threads in a drive nut 78 to which a hand wheel 80, the lower portion of which is shown, is locked to the drive nut by a set screw 82. The drive nut is rotatably supported above the bonnet by needle bearings 84 and a bonnet nut 86 which includes upper needle bearings 88. Lubricating fitting 90 is provided for lubrication of the bearings 84 and 88, and threads 76.

Referring now to FIG. 3, an assembly view of the valve seat of this invention before machining is described. The seat is formed of an inner ring 100 having a recessed portion 102 at one end thereof about which a circular length of stainless steel tubing 102 is positioned. At least one and preferably two openings 106 are provided to allow breathing of the tubing as a part of its function as a valve seat. An outer ring 108 includes a flange portion 110 which is adapted to abut against tubing insert 104 when assembled as shown. Preferably, the assembly is a press fit between inner ring 100 and outer ring 108, the assembly being such that the front surfaces of each are flush prior to machining. The result of the machining is shown in FIG. 4 wherein a seating face, generally designated by the numeral 112, includes upper and lower lip portions 114 and 116 respectively which act as a secondary seating surface for the valve core 16 supplementing the surface exposed by the tubing insert 118 is now machined. With this design the problems of high pressure, high temperature and chemically reactive fluid conditions are averted. Further, the problem of turbulence and pressure differentials caused by fluid flow when the valve is first opened or unseated, normally tending to withdraw any form of resilient or semi-resilient seating material, is overcome. In addition, the stainless steel tubing insert 104 provides substantial back-up support for the secondary seating lips 114 and 116. The valve seat is shrink-fitted within valve body 12 to provide adequate seal and retention.

The invention has been described with reference to specific and preferred embodiments. It will be apparent, however, that other modifications can be made without departing from the spirit and scope of the invention. Accordingly, this invention should be construed not to be limited to the embodiment herein described but should be limited only by the scope of the appended claims.

What is claimed:

1. In a valve for controlling flow of extreme condition fluids including a valve stem, valve core, valve body and bonnet and a guide slot and fixed follower means cooperatively situated relative to said stem and said body to permit linear movement into rotary movement, said movements sequentially timed to actuate said valve core, the improvement comprising packing rings annularly between said valve stem and said bonnet;
a metallic bonnet guide bushing annularly between said stem and said bonnet and positioned between the flow contact of said fluids and said packing;
a packing gland above said packing and a packing gland retainer above said gland, the joint between said gland and said retainer being a semi-ball-socket-type;
means between said bonnet and said gland retainer to create downward pressure force upon said gland and said packing against said bushing; and
a metallic valve seat comprising
an inner ring,
an outer ring, and
a metallic tubing insert combined so as to define a machined annular seating face for sealing engagement with said valve core, said face exposing thereto said tubing insert between respective lip portions of said inner and outer rings, and
said tubing insert having at least one radial perforation in that wall opposite said seating face.

2. A valve for controlling flow of extreme condition fluids including a valve stem, valve core, valve body and bonnet and a guide slot and fixed follower means cooperatively situated relative to said stem and said body to permit linear movement of the stem and also transfer the linear movement into rotary movement, said movements sequentially timed to actuate said valve core, comprising in combination a metallic valve seat having a machined seating face retained in said valve body for seating engagement with said valve core to shut off flow, said seat comprising
an inner ring and an outer ring fitted together to retain a metallic tubing insert therebetween at said seating face.

3. A valve according to claim 2 wherein said tubing insert has at least one perforation in the wall thereof that is not the seating face portion.

4. A valve according to claim 3 wherein said perforation is radial and is in that part of the wall thereof opposite said seating face.

5. A valve according to claim 2 wherein said tubing insert is of stainless steel.

6. A valve according to claim 2 including
extreme condition fluid resistant packing rings annularly between said valve stem and said bonnet,
a metallic bonnet guide bushing annularly positioned to support said valve stem and positioned so as to be between flow contact of said fluids and said packing,
a packing gland above said packing,
a packing gland retainer above said gland, the joint between said gland and said retainer being a semi-ball-socket-type, and
means between said bonnet and said gland retainer to create downward pressure force upon said gland and said packing against said bushing.

7. A valve according to claim 6 wherein said means includes diametrically spaced eyebolts the threaded ends of which normally extend downwardly into respective openings of said retainer and a nut operative on said threads against said retainer to create said pressure.

References Cited

UNITED STATES PATENTS

| | | | |
|---|---|---|---|
| 2,732,855 | 1/1956 | Hobbs | 251—330 X |
| 3,055,670 | 9/1962 | Sampson | 277—226 X |
| 3,131,906 | 5/1964 | King | 251—360 |

WILLIAM F. O'DEA, Primary Examiner

D. R. MATTHEWS, Assistant Examiner

U.S. Cl. X.R.

277—226